United States Patent
Ferrario

[15] 3,659,674
[45] May 2, 1972

[54] ATOMIZED OIL LUBRICATING DEVICE FOR BEARINGS AND/OR JOURNALS OF VERTICAL SHAFTS ROTATING AT HIGH SPEEDS

[72] Inventor: Luigi Ferrario, Mandello del Lario, Como, Italy

[73] Assignee: Ferrario Andrea A Figli Di Ferrario, Evangelista e Figli, Como, Italy

[22] Filed: Dec. 16, 1969

[21] Appl. No.: 885,655

[30] Foreign Application Priority Data

Sept. 10, 1969 Italy....................21835 A/69

[52] U.S. Cl..................184/6.16, 184/6.26, 308/134.1
[51] Int. Cl.......................................F16n 7/32
[58] Field of Search...............184/6 Z, 6 W, 6.26, 6.18; 123/196 W; 308/168, 134.1

[56] References Cited

UNITED STATES PATENTS

| | | | |
|---|---|---|---|
| 2,766,081 | 10/1956 | Wiedemann | 184/6.18 X |
| 2,304,644 | 12/1942 | Heftler | 184/96 X |
| 1,956,449 | 4/1934 | Leinbach | 308/168 X |

FOREIGN PATENTS OR APPLICATIONS

| | | | |
|---|---|---|---|
| 458,409 | 4/1928 | Germany | 308/168 |
| 586,579 | 10/1933 | Germany | 308/168 |
| 515,036 | 7/1955 | Canada | 184/6.18 |
| 574,263 | 3/1958 | Italy | 184/6.26 |

Primary Examiner—Manuel A. Antonakas
Attorney—Robert E. Burns and Emmanuel J. Lobato

[57] ABSTRACT

A vertical shaft rotatable at high speeds and provided with bearings and/or journals has an axial bore at its lower end immersable into lubricating oil in a tank. Openings in said shaft communicate the bore with a housing defined between the shaft and a tubular casing therefor. Oil sucked up said bore is atomized by passing through said openings. Atomized oil lubricates the journals and/or bearings and condensed oil flows back to the tank.

10 Claims, 4 Drawing Figures

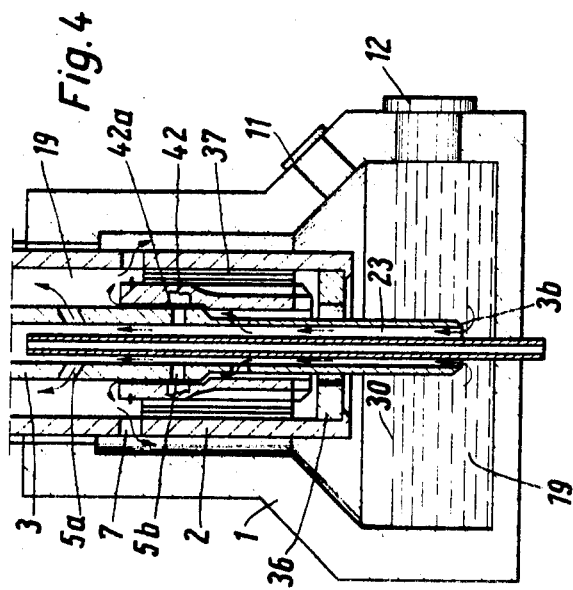
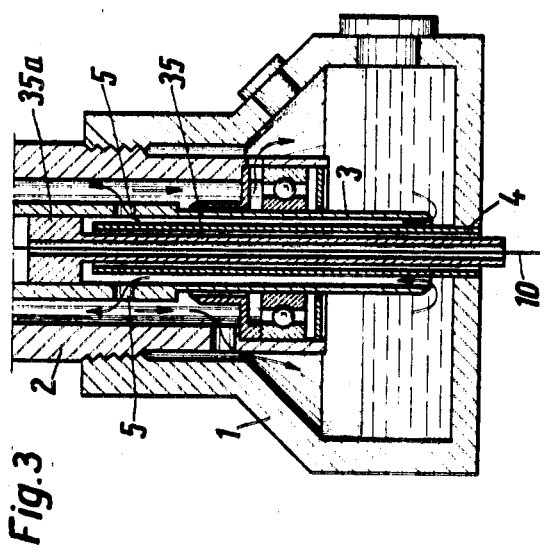

ATOMIZED OIL LUBRICATING DEVICE FOR BEARINGS AND/OR JOURNALS OF VERTICAL SHAFTS ROTATING AT HIGH SPEEDS

This invention relates to devices for lubricating bearings and/or journals of vertical shafts rotating at a very high speed with atomized oil.

Several devices have been proposed for providing an atomized oil lubrication of bearings. Such lubrication enables a shaft supported by such bearings to attain much higher speeds because oil atomization allows a much faster cooling and avoids overheating due to an excess of lubricating oil. Also, lubrication by lubricating grease exhibits considerable defects as compared with atomized oil lubrication; for example, the grease, because of the high speed of rotation of the shaft, may be centrifuged, therefore losing all of its lubricating characteristics; furthermore the grease enables only a minimal loss of heat.

However, hitherto proposed devices for providing atomized oil lubrication have been found in practice to have low efficiency and also have substantial disadvantages not permitting to take advantage of this type of lubrication.

It is the object of the present invention to provide an effective atomized oil lubricating device and which avoids the drawbacks of prior lubricating systems.

According to the invention, there is provided a device for lubricating bearings and/or journals of a vertical shaft rotatable at high speeds with atomized oil, comprising in combination: a lubricating oil tank located at the bottom of said shaft and fast with an outer tubular casing secured to a shaft holder unit; within said shaft an axial conduit having a lower port immersed in oil within said tank; an axial housing internally defined by said shaft and externally defined by said outer tubular casing; said casing supporting at least one bearing and/or journal for said shaft; a plurality of holes and/or radial slots, either horizontal or inclined, provided on the shaft and adapted to put said conduit in communication with said axial recess; a plurality of holes and/or radial slots provided on said bearing holder casing adjacent a lower journal or bearing and adapted to put said axial recess in communication with said oil tank.

The features of the lubricating device according to the present invention will now be more completely described, by way of example, with reference to the accompanying drawings, in which:

FIG. 3 is a cross-sectional view of a construction detail of a further possible modified form; and FIG. 4 is a fragmentary axial sectional view of a further possible modified form relative to FIGS. 1, 2 and 3.

Figure 1:
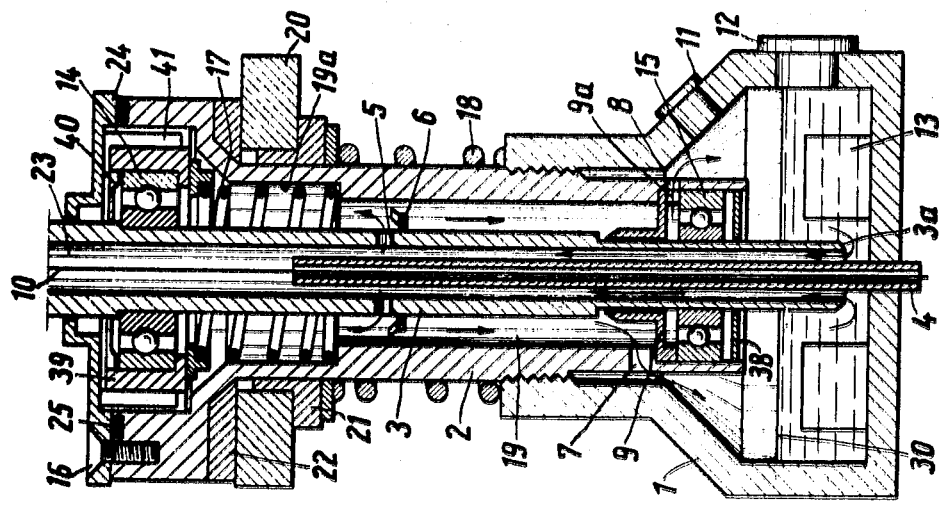
FIG. 1 is a cross-sectional view of an embodiment of the invention applied on a hollow axle.

Referring to FIG. 1, it will be seen that the device according to the invention comprises a tank 1 of a substantially cylindrical shape at the bottom, having a frusto-conical central portion and a cylindrical top portion joined to a bearing support 2. Tank 1 contains lubricating oil 30. A tube 4 is joined at and sealably passes through the bottom of tank 1 for the passage of a textile thread 10. The tank 1 is preferably metallic and has applied thereto an oil level window or gauge 12 and an oil-inlet plug 11. The tank could alternatively be made of transparent material having an oil-level indicating scale. Optionally, the bottom tank 1 has a number of ribs 13 disposed radially or otherwise to prevent the oil from rotating within the tank.

The device also comprises an axial conduit 23 within a shaft 3 having a lower port located under the oil level 30.

At the outer lower portion thereof the hollow shaft 3 has a bevelled edge 3a facilitating the passage of the lubricating oil 30 from the tank to the axial conduit 23.

The device further comprises an axial housing 19, defined internally by said shaft 3 and externally by a tubular bearing holder support 2.

At its top portion, said axial housing 19 has a recess 19a for accommodating a spring 17 for axially damping downward impacts on the shaft 3 and removing the axial clearances between the rings and rolling members of bearing 14 for the lubrication of which the device according to the present invention has been provided.

A plurality of holes and/or horizontal or inclined radial slots 5 are formed on said shaft 3; these holes and/or slots 5 put the conduit 23 into communication with the housing 19. Another plurality of holes and/or radial slots 7 and 8 are provided on the tubular bearing holder support 2 adjacent the lower bearing 15, which is also lubricated by the device of the invention; more particularly, the holes and/or slots 7 and 8 are arranged in two rows which are overlapping and angularly offset to each other. The row of holes 7 is for putting the axial housing 19 into communication with the oil tank 1. Between the row of holes 7 and the row of holes 8 a splash guard washer 9 is inserted; at the location of holes 8 said washer 9 has slits 9a for the passage and discharge of atomized oil from the housing 19 to the tank 1. Thus, there is a limited passage for the atomized oil from housing 19 to bearing 15, since washer 9 has a tubular portion which is inserted into a reduced diameter zone of shaft 3 and between the tubular portion of said washer and shaft 3 there is a certain clearance.

A splash guard washer 38 is arranged below the bearing 15 between the tubular support 2 and shaft 3. On FIG. 1 can also be seen an atomizing washer 6 which is keyed on shaft 3 just below the holes and/or radial slots 5. This atomizing washer 6, which has a plurality of teeth, is connected in the case when not very considerable speeds are involved, because in such case the centrifugal force would not be sufficient for oil atomization, as will be discussed hereinafter. Bearing 14 is housed within a damping body 39 and closed at the top by a splash guard 40 placed between said damping body 39 and shaft 3; the assembly is enclosed by a cover 24 acting as a dust cover and further splash guard.

Cover 24 is secured to support 2 by screws 16 compressing a gasket 25 therebetween. Cover 24 has two or more plugs 41 inserted between the damping body 39, preventing the rotation thereof during operation and accordingly also preventing the outer bearing ring from rotating because of the resiliency of said body 39. In a known manner, the damping bodies 22 and 21 will separate the bearing holder support 2 from platform 20. Spring 18 resiliently connects the spindle and platform 20. The lower bearing 15 may be housed within damping bodies of metal or any other suitable material.

Operation of the embodiment shown in FIG. 1 is as follows: upon rotation of shaft 3 the oil will rise along conduit 23 drawing in oil 30 from the tank 1 and being urged upwards against the walls of said conduit 23 under the action of centrifugal force. On arriving at the holes and/or slots 5, the oil exits into the axial housing 19 and is atomized by washer 6 or by said centrifugal force where very high speeds are involved.

Due to this centrifugation, a continuous oil flow is established and rises along said conduit 23. Thus an oil mist is obtained within the housing 19, a portion of which will move up to lubricate the bearing 14, while the rest will move down said recess 19 and a portion thereof will lubricate the bearing 15 while another portion will be directly conducted into the oil tank 1 through the holes 7.

The oil lubricating said bearing 15 will condense and then drop down through holes 9a and 8 into said tank 1, thus being recycled.

Figure 2:
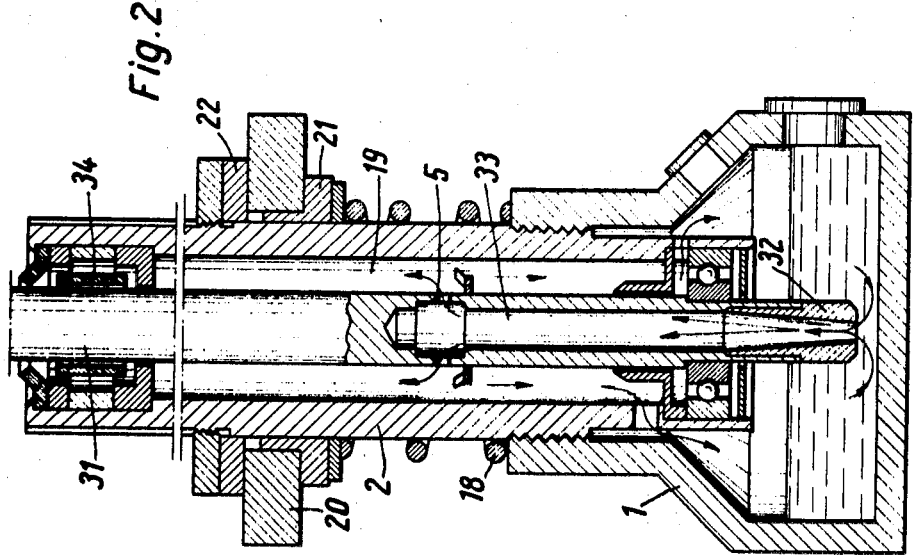
FIG. 2 is a similar cross-sectional view of a further embodiment of the invention applied on a solid shaft provided with an upper roller bearing.

FIG. 2 shows an embodiment of the device which is particularly suitable for solid shafts. Accordingly, there is shown a solid shaft 31 provided at the bottom with a blind bore 33 operating as that above described. Onto that portion of shaft 31 which is immersed in the oil, a bush 32 is slipped, this bush 32 having a frusto-conical inner surface with the minor base at the bottom, and the purpose of which is to promote the rising of oil up into bore 33. In this case, the upper bearing 34 is a roller bearing.

As shown in FIG. 3, a modified form of the embodiment shown in FIG. 1 comprises the addition of a tube 35 as outlet conduit for yarn dust outside of the spindle. At its top portion said tube 35 has an enlargment 35a for completely closing the axial conduit within shaft 3 so as to avoid any introduction of dust or the like into the lubricating oil.

A further possible modification to any of the above described embodiments is shown in FIG. 4, wherein the hollow shaft 3 is supported at the bottom by a rammer element 42 rather than by bearing 15. Said rammer element 42 rests on a bottom 36 which, in turn, is enclosed within the support 2. A spring 37 is coiled about the rammer element 42 and acts as an elasto-oleodynamic damping means. In this case the contact between shaft 3 and rammer element 42 is lubricated. In this same rammer element 42 is located a toroidal chamber 42a in correspondance with hole 5b. This chamber enables a freer outlet for oil coming from said holes.

In the practice thereof, the device according to the present invention may take forms other than those herein described and shown, without departing from the scope of the invention, as defined in the appended claims.

What is claimed is:

1. In a device for lubricating with an atomized oil the support mountings of a vertical shaft rotatable at high speeds, an improvement comprising, in combination: a vertically disposed rotatable shaft; a lubricating oil tank located at the bottom of said shaft; a vertically disposed outer tubular casing secured adjacent its lower end to said oil tank; said shaft having an axial conduit means including a lower port immersable in oil within said tank for drawing oil upwardly through said conduit means upon rotation of said shaft; a cylindrical housing internally defined by said shaft and externally defined by said outer tubular casing; bearing means for said shaft; said bearing means being mounted on said casing and within said cylindrical housing; said shaft having a plurality of openings extending therethrough and providing communication between said conduit means and said cylindrical housing; and said tubular casing having a plurality of openings in its lower end to put said cylindrical housing in communication with said oil tank, wherein, upon rotation of said shaft, said oil flows through said conduit means from said lower port to said shaft openings, whereupon said oil is distributed within said housing for lubricating said bearing means and for subsequent return flow through said casing openings into said oil tank.

2. A device according to claim 1, comprising a washer having atomizing fins or lugs keyed on said shaft just below said openings on said shaft.

3. A device according to claim 1, wherein said bearing means includes first and second shaft support means said first shaft support means being mounted on said tubular casing above said shaft opening, and said second shaft support means being mounted on said tubular casing below said casing openings, said casing openings being disposed in two rows which are angularly offset, and further comprising a splash guard washer disposed axially between said two rows of casing openings and having a set of holes aligned with the openings in the lower said row, said washer having a tubular portion and said shaft having a reduced diameter zone for receiving said tubular portion of the washer.

4. A device according to claim 3, wherein said first shaft support means includes a bearing having inner and outer rings, and comprising damping means connected between said first shaft support means and said casing for preventing said outer ring of said bearing from rotating, and splash guard and cover means for protecting said damping means, said splash guard and cover means being secured to the tubular casing.

5. A device according to claim 4, wherein said splash guard and cover means secured to the tubular casing is provided with two or more plugs for insertion into said damping means, thus preventing said damping means from rotating during operation.

6. A device according to claim 1, wherein said tank has ribs on its bottom for preventing oil within said tank from rotating.

7. A device according to claim 1, further comprising a bushing having an internal frusto-conical surface with the minor base at the bottom and immersable in oil in said oil tank, said bushing being fixed to said shaft and having the axis of said frustoconical surface disposed coaxially with the axis of said conduit means.

8. A device according to claim 1, wherein said oil tank is provided with an oil-level window or gauge and a plug for introducing said oil.

9. A device according to claim 1, further provided with a discharge tube for dusts, said discharge tube being disposed within said conduit means and having an enlargement at its upper end completely closing the conduit means internally of said shaft so as to avoid any introduction of dust or the like into said lubricating oil.

10. A device according to claim 1, wherein the device is provided with a spring about said outer tubular casing, and an annular platform also disposed about said tubular casing and resiliently connected to said casing by said spring.

* * * * *